United States Patent
Croak et al.

(10) Patent No.: US 7,593,520 B1
(45) Date of Patent: Sep. 22, 2009

(54) METHOD AND APPARATUS FOR PROVIDING VOICE CONTROL FOR ACCESSING TELECONFERENCE SERVICES

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 281 days.

(21) Appl. No.: 11/294,322

(22) Filed: Dec. 5, 2005

(51) Int. Cl.
H04M 3/42 (2006.01)

(52) U.S. Cl. .......................... 379/202.01; 379/203.01; 379/204.01

(58) Field of Classification Search ... 379/88.01–88.03, 379/93.01–93.04, 93.21, 201.01, 202.01, 379/203.01, 204.01, 205.01, 206.01, 157–158, 379/120; 370/352–356
See application file for complete search history.

(56) References Cited

U.S. PATENT DOCUMENTS

| | | | |
|---|---|---|---|
| 6,501,740 B1 * | 12/2002 | Sun et al. | 370/261 |
| 6,782,413 B1 * | 8/2004 | Loveland | 709/204 |
| 7,133,514 B1 * | 11/2006 | Cook et al. | 379/202.01 |

* cited by examiner

Primary Examiner—Suhan Ni

(57) ABSTRACT

A method and apparatus for providing access to teleconference services using voice recognition technology to receive information on packet networks such as Voice over Internet Protocol (VoIP) and Service over Internet Protocol (SoIP) networks are disclosed. In one embodiment, the service provider enables a caller to enter access information for accessing a conference service using at least one natural language response.

3 Claims, 4 Drawing Sheets

METHOD AND APPARATUS FOR PROVIDING VOICE CONTROL FOR ACCESSING TELECONFERENCE SERVICES

The present invention relates generally to communication networks and, more particularly, to a method for accessing teleconference services using voice recognition technology to enter information on networks such as packet networks, e.g., Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP are becoming ubiquitous and more and more businesses and consumers are relying on their Internet connections for staying connected and being able to conduct business at anytime from anywhere. For example, customers may now conduct businesses from moving vehicles, e.g., a moving car and so on. These customers need to pay attention to a variety of tasks such as the operation of the moving vehicles and the like. However, to join a conference call, the customer has to enter the information required to join the conference bridge, e.g., using a telephone keypad, computer keyboard, etc. The required information is often long and unfamiliar requiring the customer's full attention which may impact the customer's ability to focus on other activities, e.g., operation of a moving vehicle and the like.

Therefore, there is a need for a method that enables a teleconference service to utilize voice recognition technology for receiving information required to join a conference bridge.

SUMMARY OF THE INVENTION

In one embodiment, the present invention discloses a method and apparatus for accessing teleconference services using voice recognition technology to enter information required to join a conference bridge on networks such as packet networks, e.g., Voice over Internet Protocol (VoIP) and Service over Internet Protocol (SoIP) networks. Specifically, the service provider provides an access number to a subscriber of a conference service and enables the subscriber (or other participants) to enter required information or access information verbally to join a conference bridge such as a host code, a participant code, a password, a conference number, one or more responses to prompts, e.g., *, #, and the like. Once received, the service provider will allow the caller access to one or more conference services, e.g., bridging the caller's line to an appropriate conference call. The present invention provides access to a conference service with voice recognition technology, thereby reducing the need for keypad entries and allowing a caller to join teleconference bridges while multitasking.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for accessing teleconference services using voice recognition technology to enter information required to join a conference bridge on networks such as packet networks, e.g., Voice over Internet Protocol (VoIP) and Service over Internet Protocol (SoIP) networks. Although the present invention is discussed below in the context of providing information on VoIP and SoIP networks, the present invention is not so limited. Namely, the present invention can be applied to other networks such as a wireless network.

Figure 1:
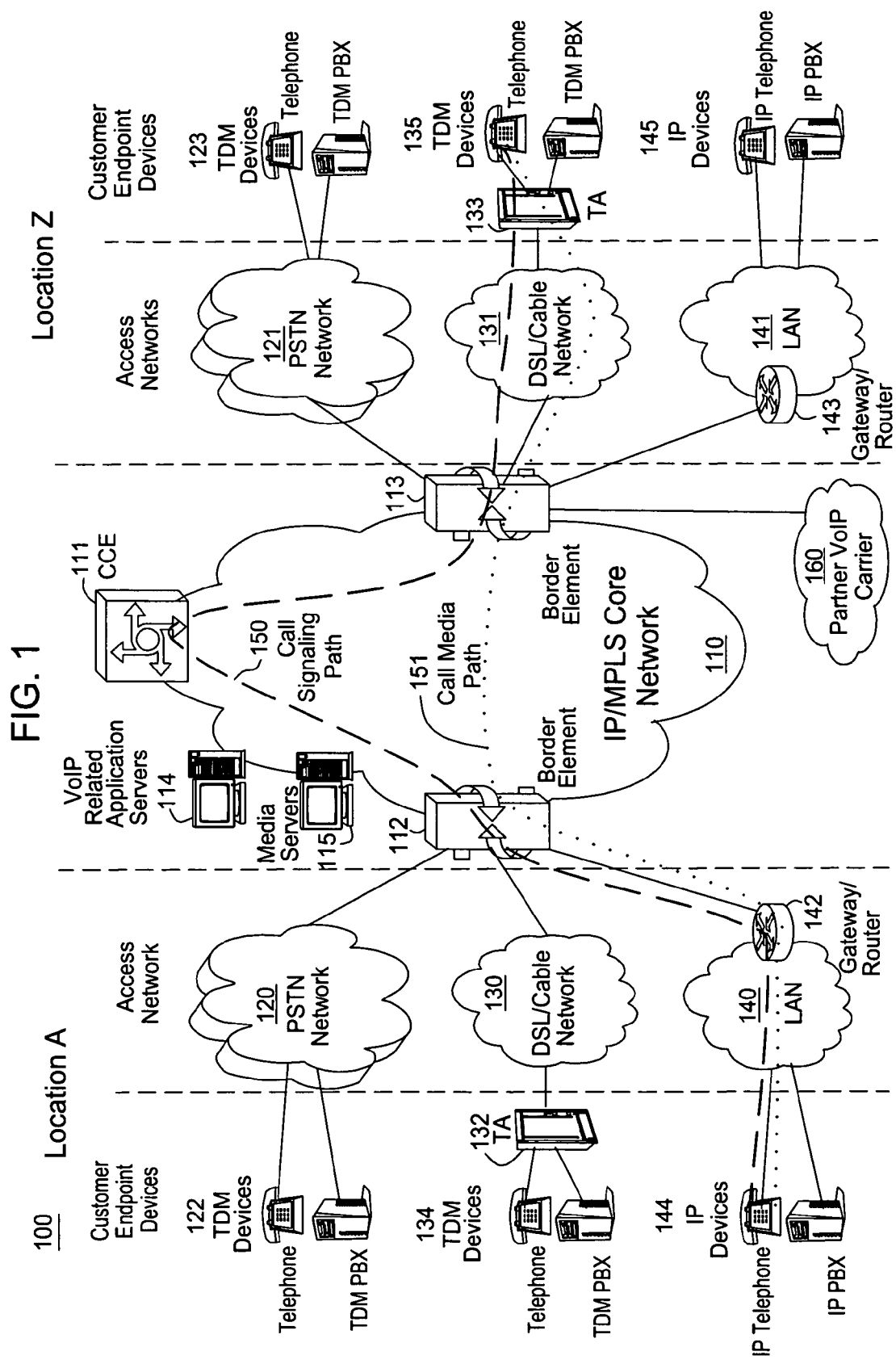
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported and services are provided on packet networks such as VoIP and SoIP networks. Internet services are becoming ubiquitous and more and more businesses and consumers are relying on their Internet connections for conducting businesses and staying connected at any time and place. For example, customers who are traveling may wish to participate in a conference call while performing other tasks, e.g., operation of a moving vehicle. However, joining a conference bridge requires entering long strings of unfamiliar information and several responses to prompts using telephone keypads, computer keyboards, etc., thereby necessitating the caller's full attention.

In one embodiment, the current invention discloses a method and apparatus for accessing teleconference services using voice recognition technology to enter information required to join a conference bridge on packet networks such as VoIP and SoIP networks. In order to clearly illustrate the teachings of the current invention, the following terminologies and networking concepts will first be described:

Conference call;
Conference bridge;
Teleconference services;
Interactive Voice Response (IVR); and
Voice recognition technology.

Conference call refers to a telephone call with three or more participants in the conversation. The conference call can be implemented by having one host or moderator call each participant, or by providing a telephone number for accessing the conference call as well as other required information such as passwords, Personal Identification Numbers (PIN), conference codes, etc. to be used by each participant for joining the conference call. Conference calls connect the participants through conference bridges as defined below.

Conference bridge refers to one or more servers with capabilities to answer multiple telephone calls simultaneously, e.g., to bridge a plurality of callers to a conference call. Thus, a conference bridge allows multiple participants to converse with each other.

A teleconference service refers to a conference call service that is provided by a teleconferencing service provider such as the telephone company. For example, an enterprise customer may subscribe to a conference call service with a service provider to handle all its teleconferencing needs.

Interactive Voice Response (IVR) refers to a telecommunications technology where users interact with a database without requiring human interaction over the telephone. For example, a conference call that requires a password or a PIN number can utilize an IVR application to prompt the caller to enter the information by pushing the numbers on the telephone keypad.

Voice recognition technology refers to a technology that understands spoken words, e.g., natural spoken language and enables the user to enter data by speaking into a device. For example, if a user is unable to use a computer keyboard to enter data, the user may speak into a voice input device such as a microphone.

In one embodiment, the current invention utilizes voice recognition technology to enable customers of a teleconference service to enter information required to join conference bridges using spoken language. The service provider provides an access number for the service. When the customer dials the access number, the service provider uses an IVR application, e.g., implemented on a media server, to provide the prompts and instructions for entering the required information and interact with the customer. The customer uses his/her voice to enter the requested information, e.g., the customer speaks into the telephone handset. The service provider processes the information, identifies the appropriate conference, and enables the caller to join the conference bridge.

Figure 2:
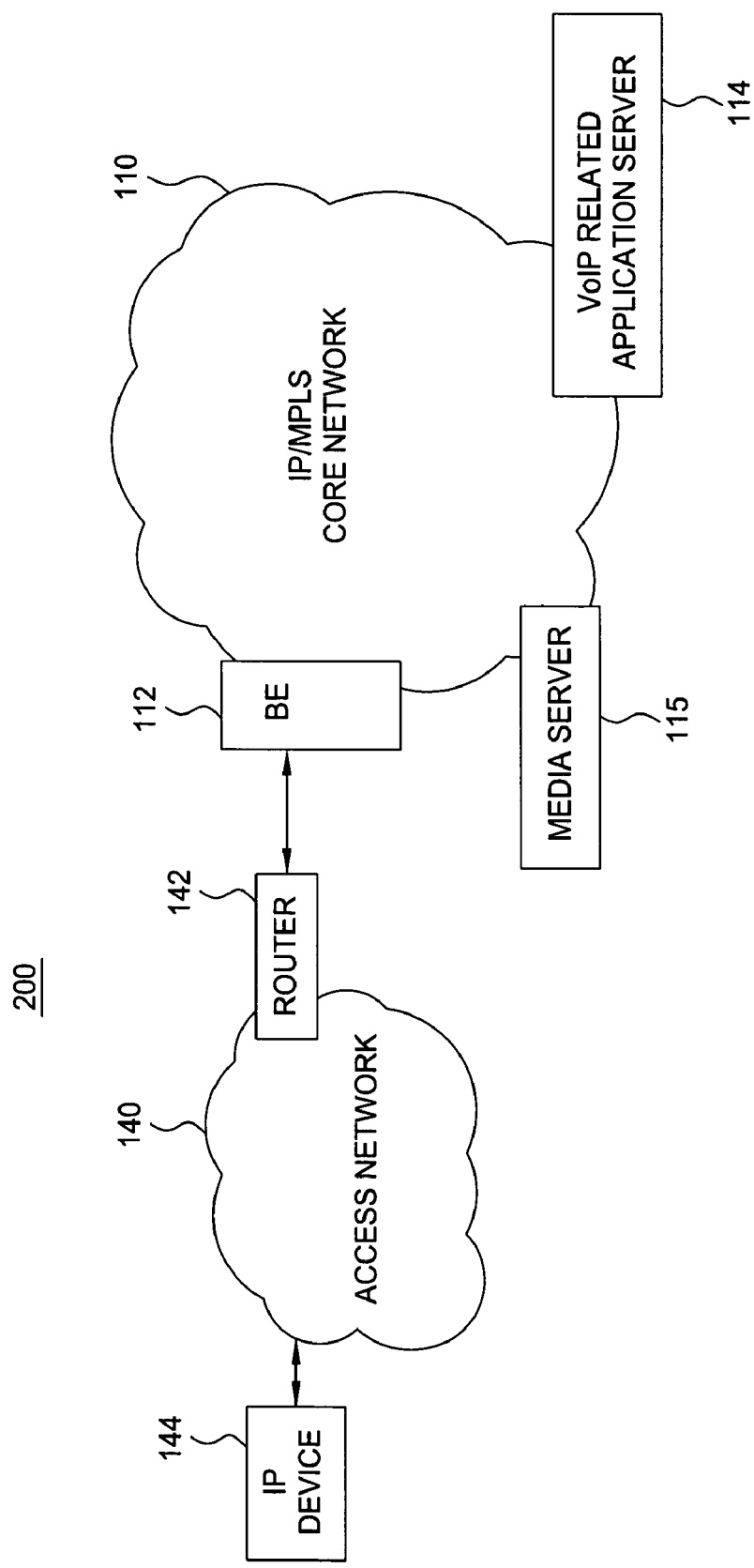
FIG. 2 illustrates an exemplary network with one embodiment of the invention for enabling voice control for accessing teleconference services.

FIG. 2 illustrates an exemplary network 200 in accordance with one embodiment of the present invention for enabling voice control for accessing teleconference services. For example, the customer is using the IP device 144 to access the IP services such as VoIP and SoIP services. IP device 144 is connected to the access network 140. The access network 140 contains a gateway router 142. The gateway router is connected to the IP/MPLS core network 110 through the border element 112. The VoIP application server 114 is in the IP/MPLS core network. The service provider utilizes the application server 114 to implement the present invention for enabling voice control for accessing teleconference services. For example, the service provider implements a network based voice recognition technology for enabling customers to access teleconference services by entering responses to prompts using natural spoken language. The application server 114 utilizes the media server 115 for media related functions such as providing responses to customer request in a format compatible with the receiving device used by the customer, handling and terminating media streams, and providing services such as announcements, bridges, Interactive Voice Response (IVR) messages, etc.

In one embodiment, the service provider provides an access number e.g., a toll free number for accessing a teleconference services by the customer, and implements the present invention for enabling voice control for accessing teleconference services on the application server 114. The customer dials the access number using the IP device 144. The application server 114 receives the call and engages the media server 115 for interacting with the customer using an IVR application. For example, the customer may be asked to enter a conference number and a password by speaking into the telephone handset. The application server receives and authenticates the input (responses) from the customer, determines the appropriate conference, and enables the customer to join the conference bridge. Note that only the network elements used to describe the invention are illustrated in FIG. 2. It is not intended to show all network elements used to deliver a VoIP or SoIP service.

In one embodiment, the application server 114 is capable of receiving a natural spoken language response. Specifically, the application server is capable of understanding a response that may be outside of an expected syntax. To illustrate, the application server may request the caller to provide a password, where the application server may be expecting a response or utterance that pertains to a syntax that is typically associated with a password. However, instead, the caller states that he or she has forgotten his or her password and would like the service provider to authenticate the caller's identity because the caller is unable to provide the requested password. Since the application server is capable of understanding a natural language response, e.g., the application server is using a natural language speech recognition module with a natural language parser, the application server will proceed with an authentication process instead of simply denying access to the conference call as requested by the caller. For example, the system may ask the caller to provide personal information such as a birth day, a billing address, a social security number, the caller's mother's maiden name, a phone number associated with a billing address and so on.

Alternatively, the caller may request additional conferencing services using natural spoken responses or requests. For example, if the caller is traveling, the caller may ask the service provider to mute inputs from its endpoint device. Namely, the caller may simply want to listen in on the conference call but does not want to interrupt the call by allowing background noise to interfere with the conferencing call. Thus, the caller may provide a password as requested by the application server and also states that the caller wants his or her inputs to be muted until further notice, e.g., receiving a particular DTMF signal.

Figure 3:
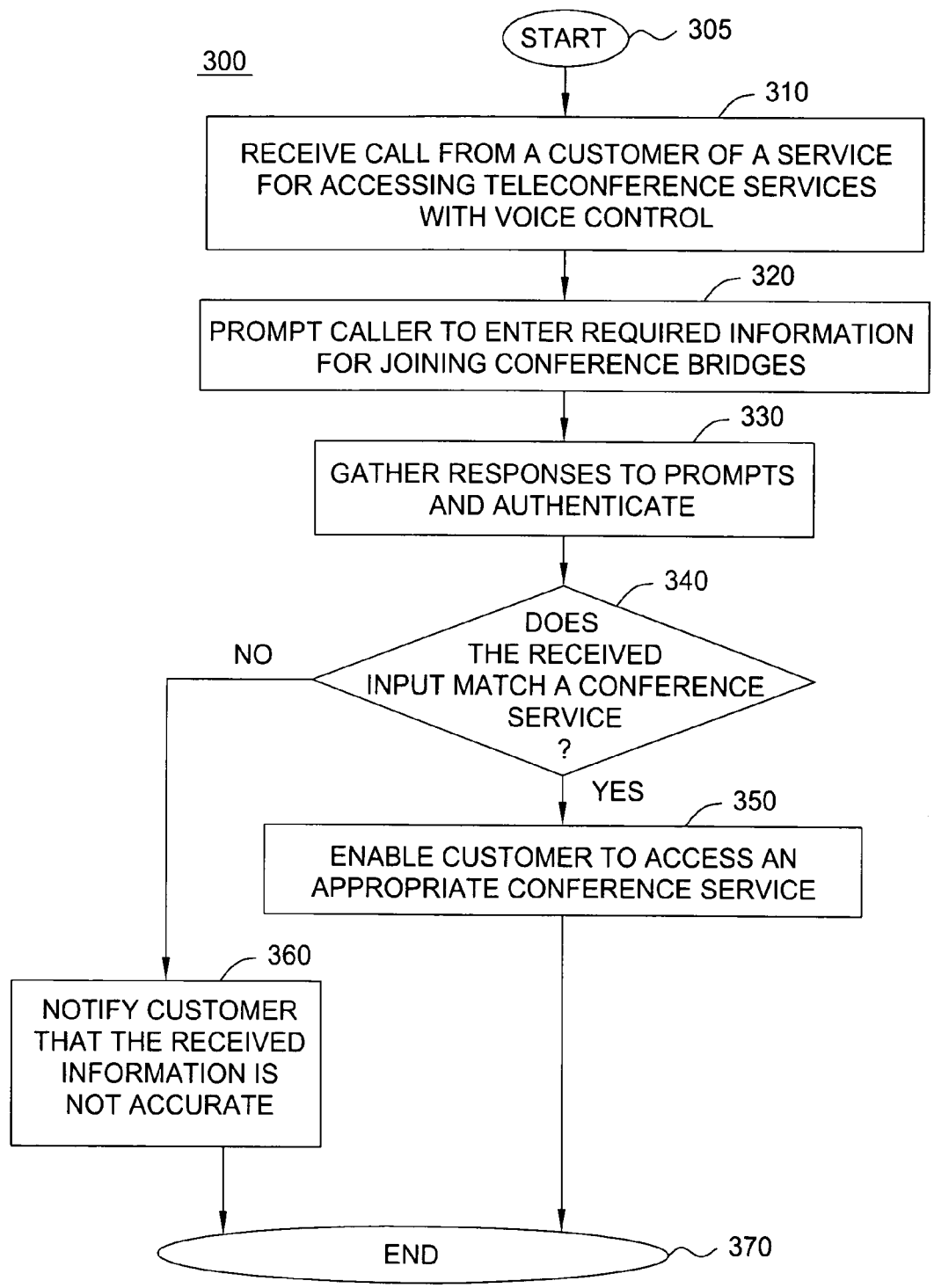
FIG. 3 illustrates a flowchart of the method for enabling voice control for accessing teleconference services.

FIG. 3 illustrates a flowchart of one embodiment of an exemplary method 300 for providing voice control for accessing teleconference services. For example, the method 300 can be implemented by the application server 114. Method 300 starts in step 305 and proceeds to step 310.

In step 310, method 300 receives a call from a customer for accessing at least one teleconference service using voice control. For example, a customer dials an access number such as a toll free number (e.g., an 800-type number) for accessing the conference service. For example, the service provider provides the access number to the customer when the customer subscribes for the teleconference service.

In step 320, method 300 prompts the caller to enter required information for joining a conference bridge. For example, the application server utilizes a media server with IVR to interact with the customer, e.g., notify the customer to enter access information, e.g., a conference number, a conference name, a PIN number, a password, a host code, and/or a participant code using his/her voice.

In step 330, method 300 gathers the spoken input received from the customers and authenticates the customer's request. For example, the customer provides the conference number and the necessary password using his/her own voice. The IVR in the media server can interact with the customer to authenticate the provided information. For example, the IVR may ask the customer "You stated the conference number as xxx, is that correct? Please say yes or no.", etc. When the information is gathered and authenticated successfully, the method proceeds to step 340.

In step 340, method 300 determines whether or not the received input matches one or more conference services, e.g., requesting to be connected to a conference bridge and the like. If the received input matches a conference service, e.g., a conference bridge, then the method proceeds to step 350 to enable the customer to access a conference service. Otherwise, the method proceeds to step 360 to notify the caller that the received information is not accurate. For example, if a customer requests to join a conference with identification xxx and PIN number yyy and a match is found, then the method proceeds to step 350 and enables the caller to join the conference bridge.

In step 350, method 300 enables the customer to access a conference service, e.g., to join a requested conference bridge. Thus, the customer can begin to converse with all the participants on a conference call. The method then proceeds to step 370 to end processing of the current request. Note that the customer can terminate the bridge without affecting other participants. For example, a customer (participant) may attend only a portion of a meeting using the conference bridge.

In step 360, method 300 notifies the customer that the received information is not accurate. For example, if the customer provided an inaccurate PIN number, then the customer may be notified that the data is not accurate and that he/she needs to contact the host or moderator of the conference call. Alternatively, if the caller is a subscriber, then the subscriber can request an authentication process be started to obtain the necessary information to gain access to the conference service. The method then ends in step 370.

Figure 4:
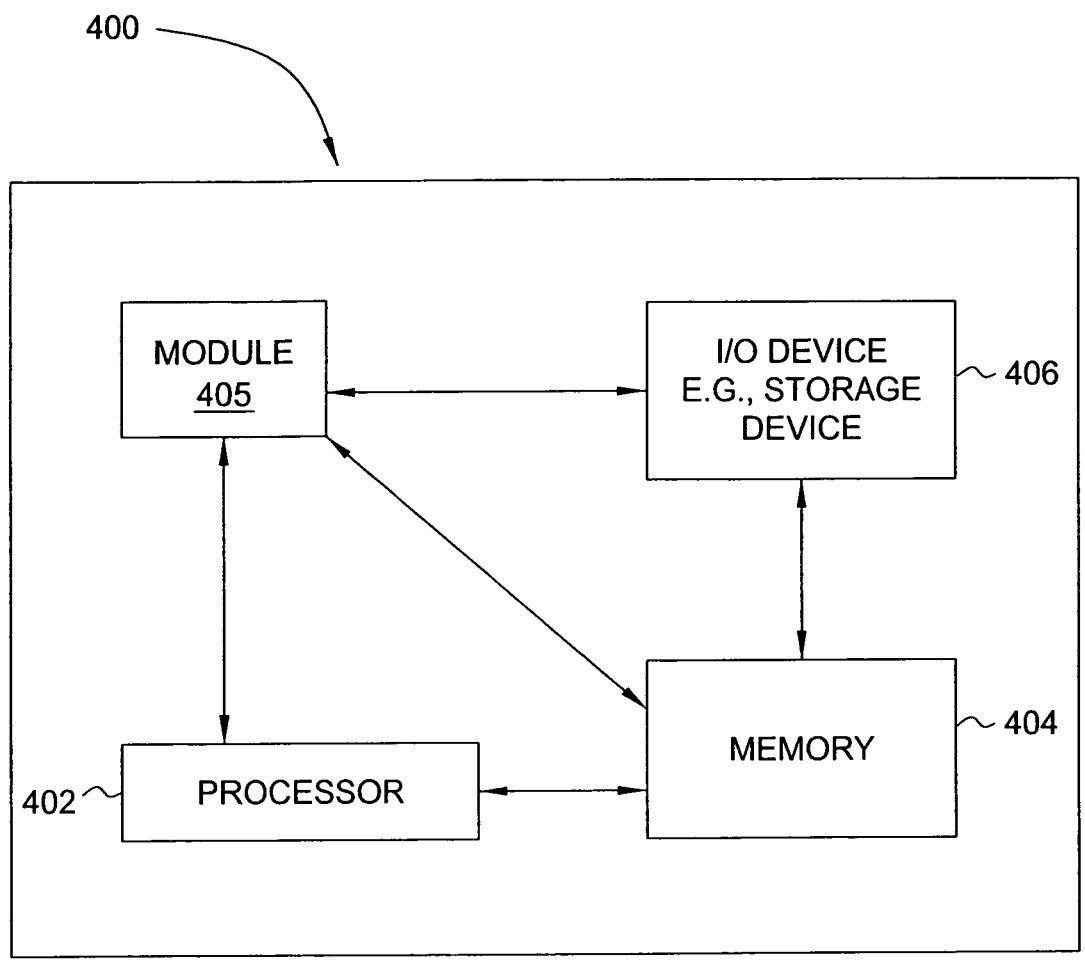
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing voice control for accessing teleconference services, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing voice control for accessing teleconference services can be loaded into memory 404 and executed by processor 402 to implement the functions as discussed above. As such, the present method 405 for providing voice control for accessing teleconference services (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing voice control for accessing a conference service in a communication network, comprising:
    receiving a request from a caller to access a conference service;
    interacting with said caller to receive access information related to said conference service for joining a particular conference bridge in a natural language response;
    providing access to said conference service if said access information is authenticated to allow said caller to access said conference service; and
    starting an authentication process if said caller is a subscriber who is unable to provide the access information, wherein a triggering of said authentication process is deduced from said natural language response.

2. A computer-readable medium having stored thereon a plurality of instructions, the plurality of instructions including instructions which, when executed by a processor, cause the processor to perform the steps of a method for providing voice control for accessing a conference service in a communication network, comprising:
    receiving a request from a caller to access a conference service;
    interacting with said caller to receive access information related to said conference service for joining a particular conference bridge in a natural language response;
    providing access to said conference service if said access information is authenticated to allow said caller to access said conference service; and
    starting an authentication process if said caller is a subscriber who is unable to provide the access information, wherein a triggering of said authentication process is deduced from said natural language response.

3. An apparatus for providing voice control for accessing a conference service in a communication network, comprising:
    means for receiving a request from a caller to access a conference service;
    means for interacting with said caller to receive access information related to said conference service for joining a particular conference bridge in a natural language response;
    means for providing access to said conference service if said access information is authenticated to allow said caller to access said conference service; and
    means for starting an authentication process if said caller is a subscriber who is unable to provide the access information, wherein a triggering of said authentication process is deduced from said natural language response.

* * * * *